US006955547B2

(12) United States Patent
Chou

(10) Patent No.: US 6,955,547 B2
(45) Date of Patent: Oct. 18, 2005

(54) CARD EJECTING MECHANISM FOR AN ELECTRONIC APPARATUS

(75) Inventor: Chi-Wen Chou, Hsi Chih (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/866,464

(22) Filed: Jun. 10, 2004

(65) Prior Publication Data

US 2004/0266238 A1 Dec. 30, 2004

(30) Foreign Application Priority Data

Jun. 24, 2003 (TW) .............................. 92211516 U

(51) Int. Cl.[7] .............................................. H01R 13/62
(52) U.S. Cl. ...................................... 439/159; 439/152
(58) Field of Search ............................... 439/159, 152, 439/160, 153, 155, 923

(56) References Cited

U.S. PATENT DOCUMENTS

| | | | | |
|---|---|---|---|---|
| 5,036,430 A * | 7/1991 | Hills | .......................... | 361/684 |
| 6,488,528 B2 * | 12/2002 | Nishioka | .................... | 439/489 |
| 6,537,090 B2 * | 3/2003 | Ozawa | ....................... | 439/159 |
| 6,773,280 B2 * | 8/2004 | Sasaki et al. | ............... | 439/159 |
| 6,848,921 B2 * | 2/2005 | Ngo | ........................... | 439/155 |

* cited by examiner

*Primary Examiner*—Chandrika Prasad
(74) *Attorney, Agent, or Firm*—Ladas & Parry LLP

(57) ABSTRACT

A card ejecting mechanism includes a push member movable relative to a card retainer, and a buffer member including a retarding piece formed thereon and disposed between the card retainer and the push member in such a manner that when the push member is moved to an ejection position, the buffer member bends toward the card retainer so as to abut slidably against a card kept in the card retainer, thereby retarding the ejecting force when the card is ejected from the card retainer.

7 Claims, 6 Drawing Sheets

CARD EJECTING MECHANISM FOR AN ELECTRONIC APPARATUS

FIELD OF THE INVENTION

The invention relates to an electronic apparatus, such as a digital camera, more particularly to an electronic apparatus having a card ejecting mechanism for retarding a releasing force of a card, such as a compact flash card, when the card is ejected.

BACKGROUND OF THE INVENTION

A digital camera, being small in volume and capable of storing a great number of images, is greatly preferred to and appreciated by the user, and thus becomes a popular demand in the market trench. No film roll is needed to take picture of views and persons, and therefore there is no problem of rinsing and developing the negative film.

Referring to FIG. 1, a digital camera (not shown) generally includes a card reading mechanism 10 and a card ejecting mechanism 16. The card ejecting mechanism 16 is electrically connected to the card reading mechanism 10 via an electrical connector 24, and includes a card retainer 18, a push member 20, and an ejector rod 22.

As illustrated, the card retainer 18 defines a card opening 12 via which a card 14, such as a memory card, a multimedia card, a smart media card, and a compact flash card, is inserted so as to be electrically communicated with the card reading mechanism 10 for reading and converting the stored images therein into pictures or photos via a computer, and via which the card 14 is ejected. The push member 20 is disposed at one side of the card retainer 18, and is movable reciprocally relative to the card retainer 18. The ejector rod 22 is pivoted on the card retainer 18 via a fulcrum 26 opposite to the card opening 12, and has a first end pivoted to the push member 20, and a second end serving as an ejecting end 28 in such a manner that movement of the push member 20 to an ejection position causes the ejecting end 28 of the ejector rod 22 to released the card 14 from the card retainer 18.

The releasing force of the card 14 is relatively great. If the user does not put his hand near the card opening 12 during the releasing operation, the card 14 may fall onto and collide against the ground, thereby damaging the card 14.

SUMMARY OF THE INVENTION

The object of the present invention is to provide a card ejecting mechanism for use in an electronic apparatus that can eliminate the aforesaid disadvantage of the prior art camera.

A card ejecting mechanism of the present invention is used in an electronic apparatus and is capable of retarding a releasing force of a card that is ejected outwardly and suddenly therefrom. The card ejecting mechanism accordingly includes: a card retainer defining a card-receiving space that is adapted to receive the card therein, the card retainer having a first end portion formed with a card opening via which the card is adapted to be inserted into the card retainer and via which the card is adapted to be ejected from the card retainer; a push member connected to and movable reciprocally relative to the card retainer between an ejection position, in which the card is adapted to be ejected from the card retainer, the push member having an outer surface formed with an interfering part that is disposed adjacent to one side of the card retainer; and a buffer member mounted on the card retainer, and including a retarding piece formed on an outer surface thereof, disposed between said one side of the card retainer and the push member in such a manner that movement of the push member to the ejection position results in collision between the interfering part and the retarding piece, which in turn, results in extension of the buffer member in a direction toward the card in the card retainer so as to abut slidably against the card, thereby retarding the ejection force of the card when the card is ejected.

BRIEF DESCRIPTION OF THE DRAWING

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

Figure 1:
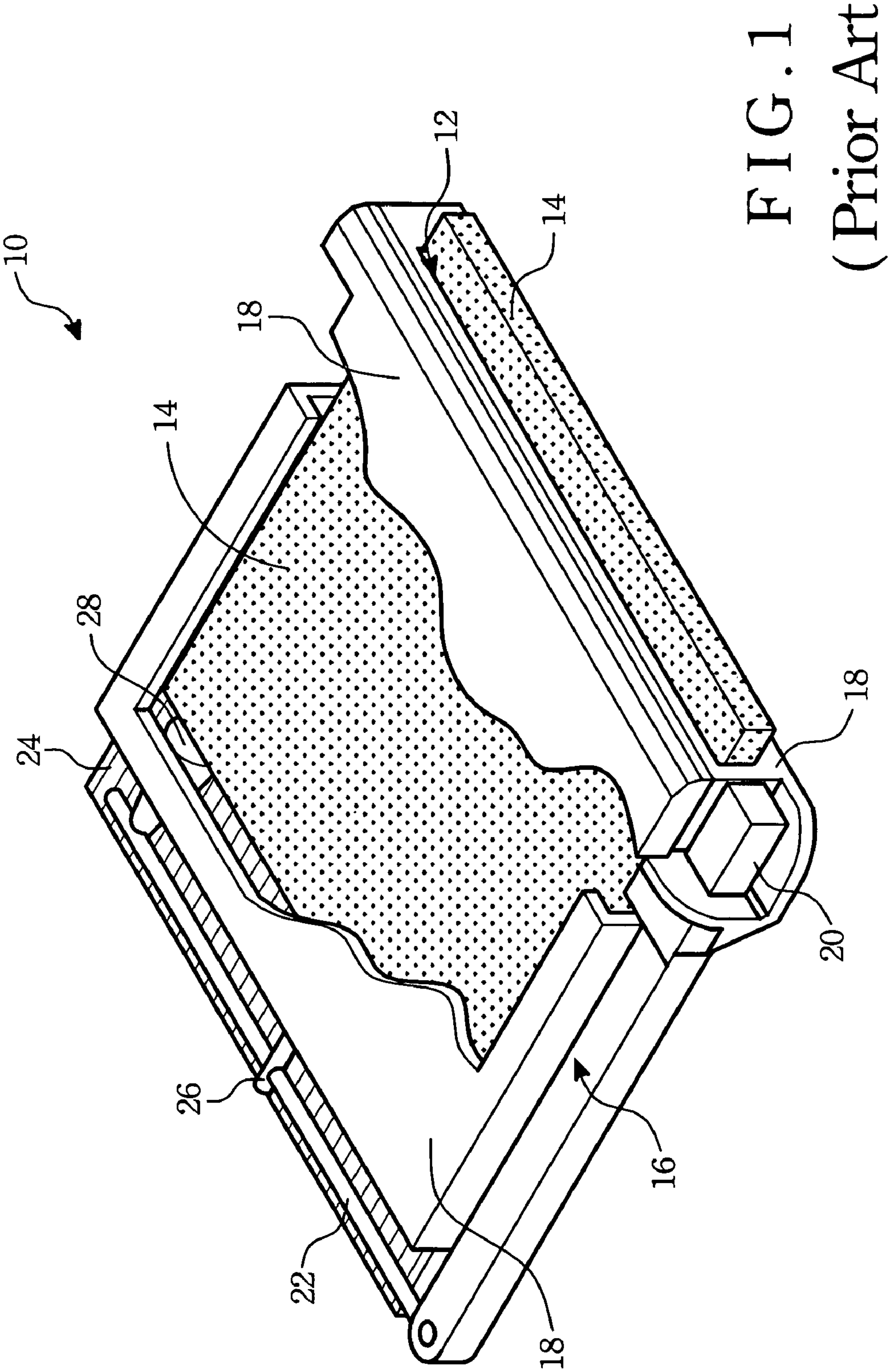
FIG. 1 shows a fragmentary view, illustrating how a conventional ejecting mechanism ejects a card therefrom.
Figure 2:
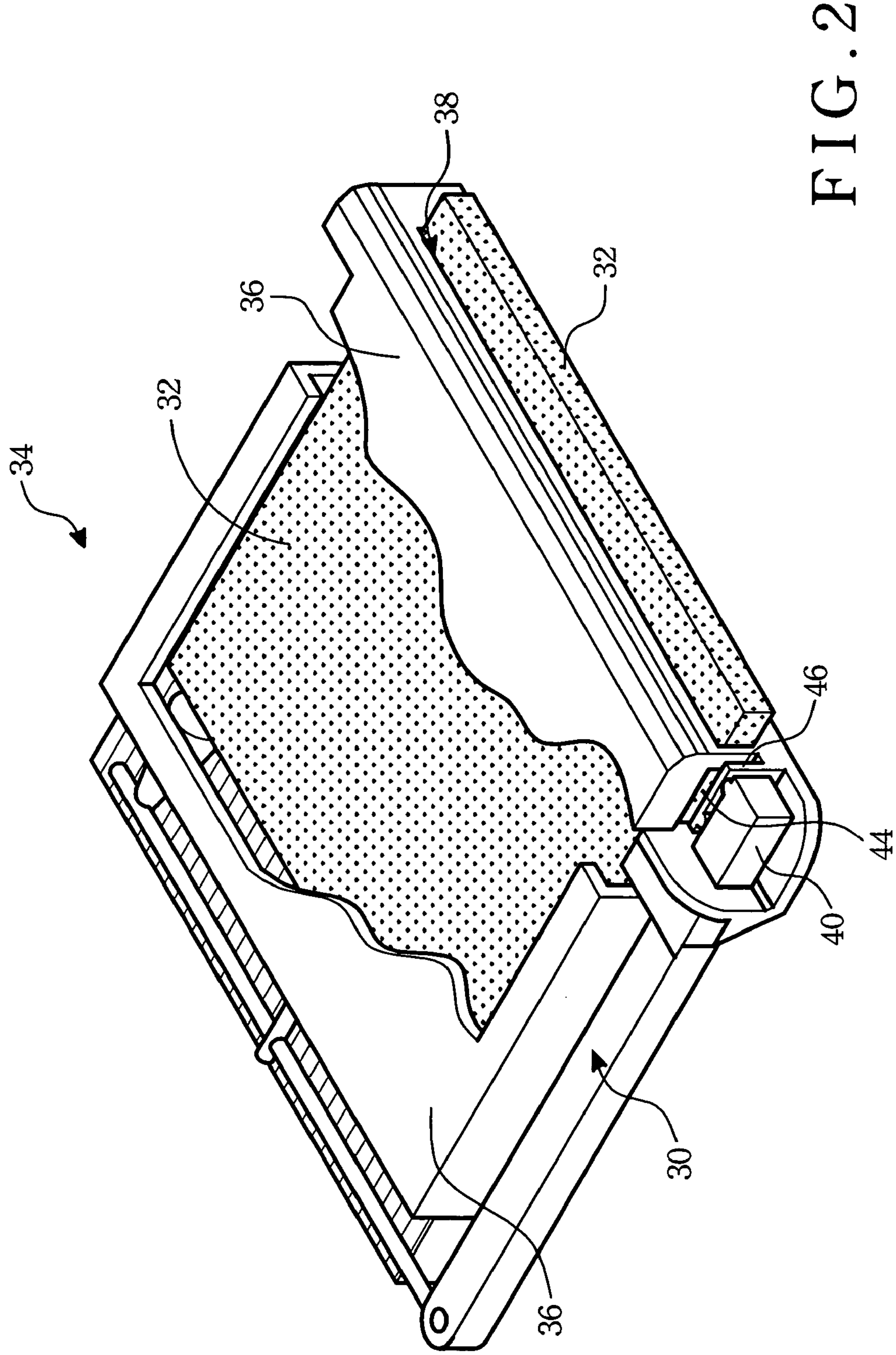
FIG. 2 is a fragmentary perspective view the preferred embodiment of an ejecting mechanism according to the present invention.

Referring to FIG. 2, the preferred embodiment of a card ejecting mechanism 30 according to the present invention is used in an electronic apparatus, such as a digital camera, and is capable of retarding a releasing force of a card 32 that is ejected outwardly and suddenly therefrom. The releasing force will be known as ejection force hereinafter. The preferred embodiment accordingly includes a card retainer 36, a push member 40, a buffer member 46, an ejector rod 52, and an electrical connector 50.

As illustrated, the card retainer 36 defines a card-receiving space that is adapted to receive the card 32 therein. The card retainer 36 has a first end portion formed with a card opening 38 via which the card 32 is adapted to be inserted into the card retainer 36 and via which the card 32 is adapted to be ejected from the card retainer 36.

Figure 3:
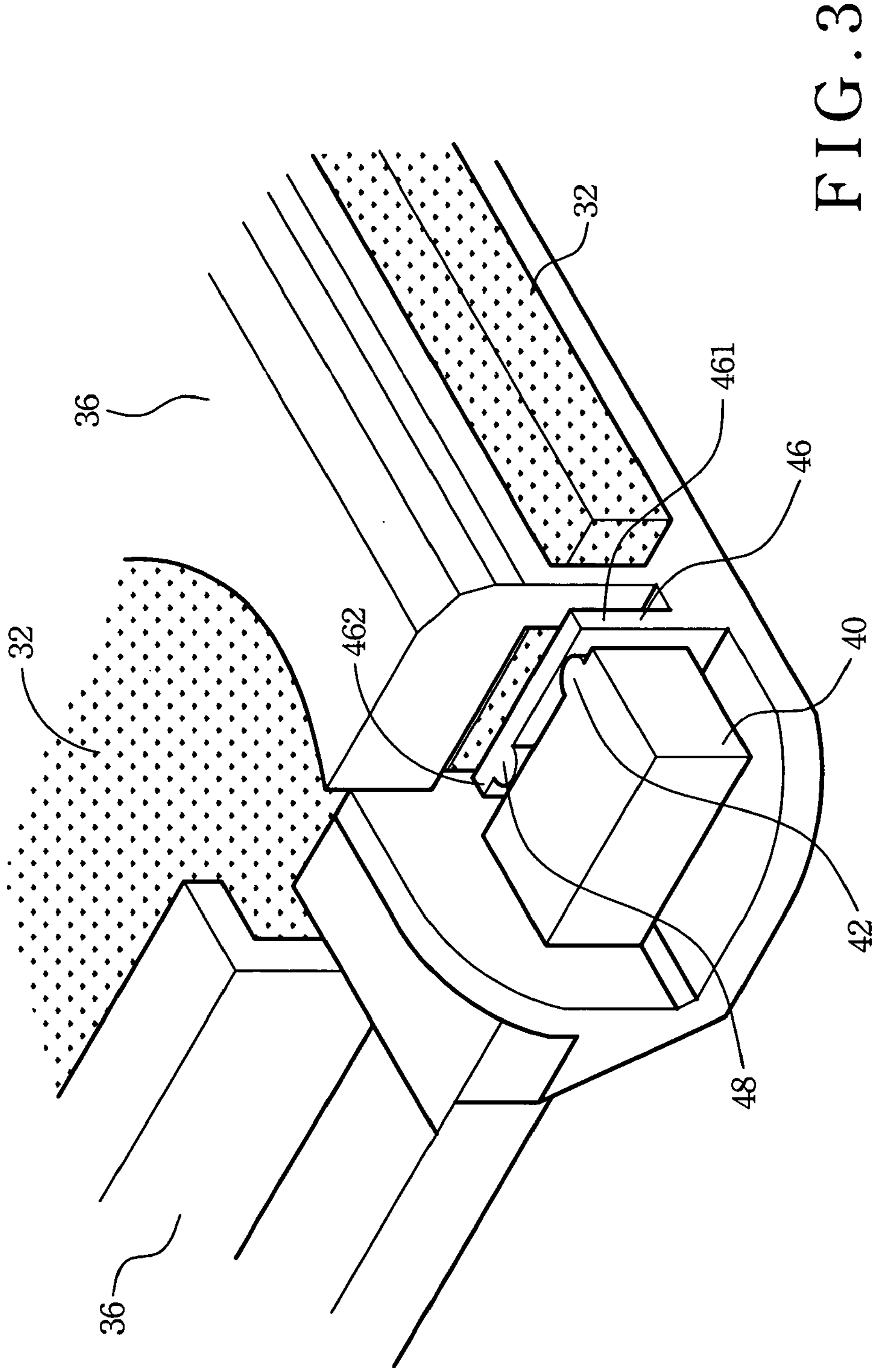
FIG. 3 is an enlarged perspective view, illustrating a push member of the preferred embodiment is disposed at a non-ejection position.
Figure 4:
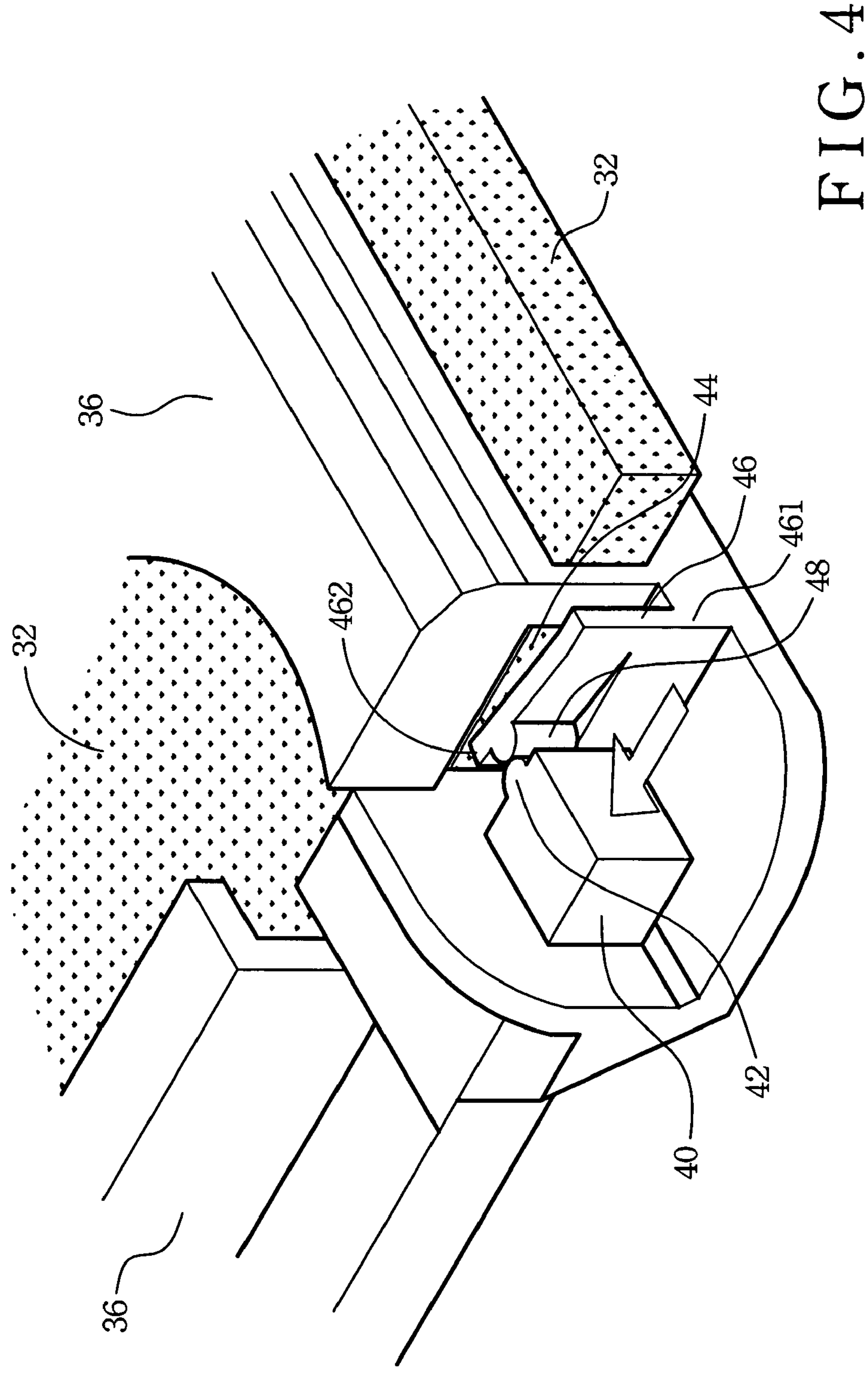
FIG. 4 is an enlarged perspective view, illustrating the push member of the preferred embodiment is disposed at an ejection position.

The push member 40 is connected to and is movable reciprocally relative to the card retainer 36 between an ejection position (see FIG. 4), in which the card 32 is ejected from the card retainer 36, and a non-ejection position (see FIG. 3), in which the card 32 is kept within the card retainer 36. The push member 40 has an outer surface formed with an interfering part 42 that is disposed adjacent to one side of the card retainer 36.

The buffer member 46 is mounted on the card retainer 36, and is disposed between said one side of the card retainer 36 and the push member 40, and has a mounting end 461 fixed on the card retainer 36, and a free end 462 opposite to the mounting end and formed with a retarding piece 48. When the push member 40 is moved to the ejection position, the free end 462 of the buffer member 46 is capable of bending in a direction toward the card retainer 36 so as to abut slidably against the card 32 due to collision between the interfering part 42 and the retarding piece 48, thereby retarding the ejection force of the card 32 when the card is ejected.

In this preferred embodiment, the one side of the card retainer 36 is formed with a side opening 44 that is in spatial communication with the card-receiving space. Since the free end 462 of the buffer member 46 is disposed between the push member 40 and the side opening 44 in such a manner that collision between the interfering part 42 and the retarding piece 48 by virtue of movement of the push member 40 to the ejection position results in extension of the free end 462 into the card retainer 36 via the side opening 44.

Preferably, the ejector rod 52 is pivoted to the card retainer 36 about a pivot point (a fulcrum 54) opposite to the card opening 38, and has a first end pivoted to the push member 40 (see FIG. 5), and a second end as an ejecting end 56, whereby movement of the push member 40 to the ejection position causes the ejecting end 56 to eject the card 32 from the card retainer 36 (see FIG. 6) via the card opening 38 (see FIG. 2).

The card retainer 36 has a second end portion opposite to the first end portion. The pivot point 54 is formed on the second end portion of the card retainer 36.

Figure 5:
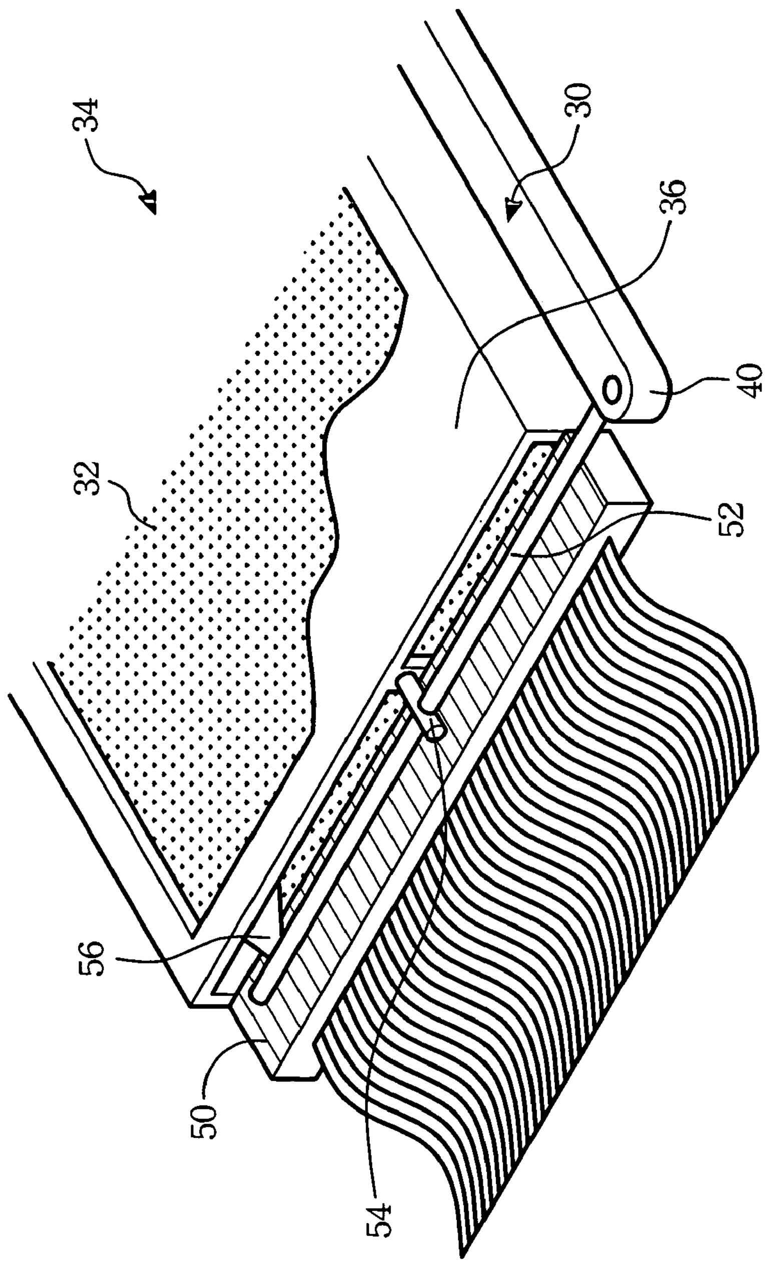
FIG. 5 is a fragmentary, perspective view of the preferred embodiment.
Figure 6:
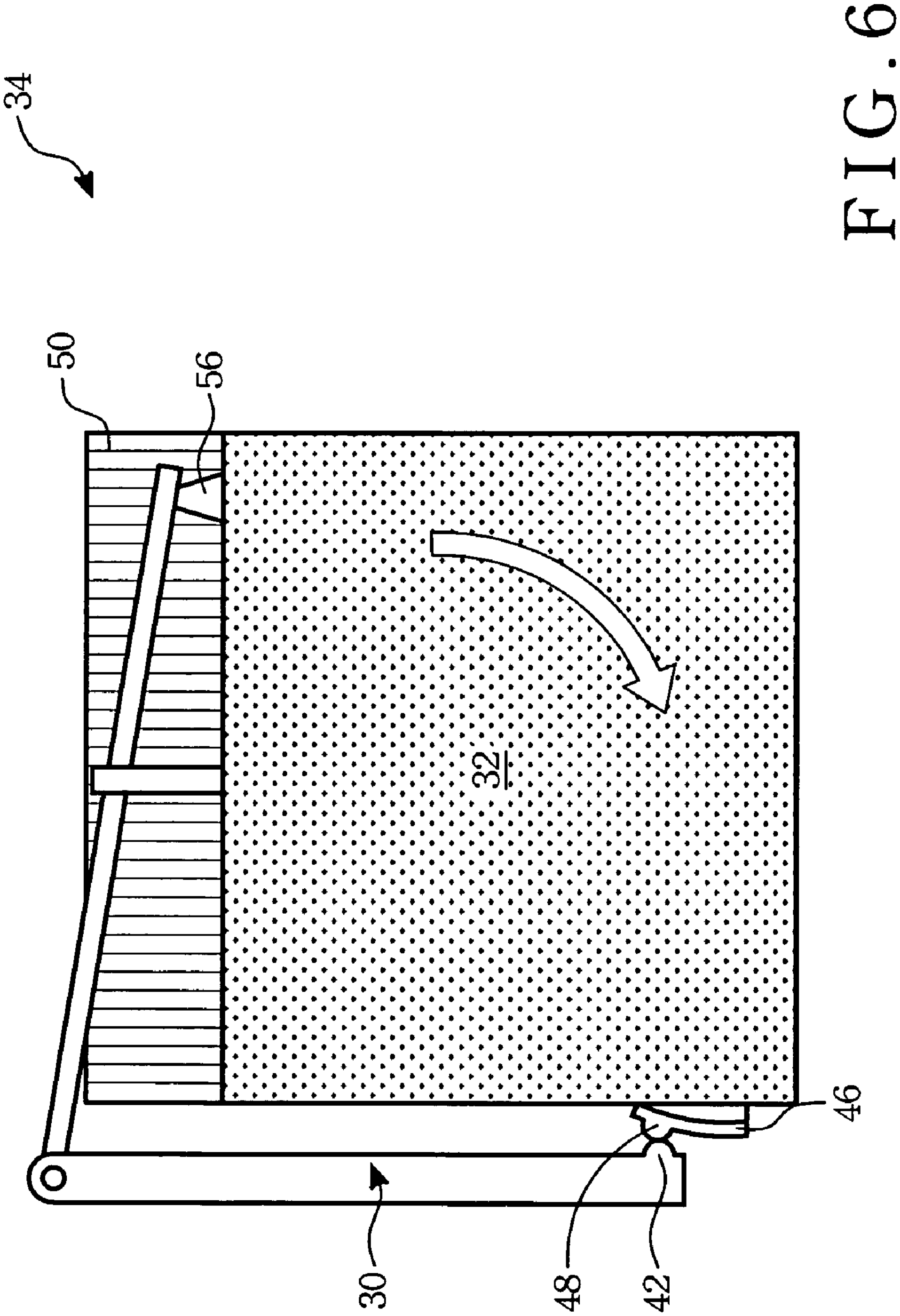
FIG. 6 is a top planar view, illustrating how a card is ejected by the preferred embodiment of the present invention.

As best shown in FIG. 5, the electrical connector 50 is connected to the card retainer 36 opposite to the card opening 44 for electrically connecting the card 32 to other components of the electronic apparatus when the card 32 is inserted into the card retainer 36.

Since the ejecting force of the card 32 is retarded by the card ejecting mechanism of the present invention, the problem of falling off the card 32 from the card retainer 36 can be avoided.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A card ejecting mechanism for an electronic apparatus, the card ejection device capable of retarding a releasing force of a card that is ejected outwardly and suddenly therefrom and comprising:

- a card retainer defining a card-receiving space that is adapted to receive the card therein, said card retainer having a first end portion formed with a card opening via which the card is adapted to be inserted into said card retainer and via which the card is adapted to be ejected from said card retainer;
- a push member connected to and movable reciprocally relative to said card retainer between an ejection position, in which the card is adapted to be ejected from said card retainer, said push member having an outer surface formed with an interfering part that is disposed adjacent to one side of said card retainer; and
- a buffer member mounted on said card retainer, and including a retarding piece formed on an outer surface thereof, disposed between said one side of said card retainer and said push member in such a manner that movement of said push member to said ejection position results in collision between said interfering part and said retarding piece, which in turn, results in extension of said buffer member in a direction toward the card in said card retainer so as to abut slidably against the card, thereby retarding the releasing force of the card when the card is ejected.

2. The card ejecting mechanism according to claim 1, wherein said buffer member has a mounting end fixed on said card retainer, and a free end opposite to said mounting end and formed with said retarding piece, said free end of said buffer member capable of bending toward said card retainer so as to abut slidably against the card when said push member is moved to said ejection position.

3. The card ejecting mechanism according to claim 1, wherein said one side of said card retainer is formed with a side opening that is in spatial communication with said card-receiving space, said free end of said buffer member being disposed between said push member and said side opening in such a manner that collision between said interfering part and said retarding piece by virtue of movement of said push member to said ejection position results in extension of said free end into said card retainer via said side opening in said one side of said card retainer.

4. The card ejecting mechanism according to claim 1, wherein the card is a compact flash card.

5. The card ejecting mechanism according to claim 1, further comprising an ejector rod that is pivoted to said card retainer about a pivot point opposite to said card opening and that has a first end pivoted to said push member, and a second end as an ejecting end, whereby movement of said push member to said ejection position causes said ejecting end to eject the card from said card retainer via said card opening.

6. The card ejecting mechanism according to claim 5, wherein said card retainer has a second end portion opposite to said first end portion, said pivot point being formed on said second end portion of said card retainer.

7. The card ejecting mechanism according to claim 1, further comprising an electrical connector connected to said card retainer opposite to said card opening for electrically connecting the card to the electronic apparatus.

* * * * *